United States Patent
Ovaere et al.

(10) Patent No.: US 10,151,655 B2
(45) Date of Patent: Dec. 11, 2018

(54) PRESSURE SENSOR CONTAINING MECHANICALLY DEFORMING ELEMENTS

(71) Applicant: Mersen Benelux BV, AR Schiedam (NL)

(72) Inventors: Peter Ovaere, Wemmel (BE);
Pieter-Jan Schepens, Aarschot (BE)

(73) Assignee: Mersen Benelux BV, Schiedam (NL)

( * ) Notice: Subject to any disclaimer, the term of this patent is extended or adjusted under 35 U.S.C. 154(b) by 0 days.

(21) Appl. No.: 15/514,857

(22) PCT Filed: Oct. 1, 2015

(86) PCT No.: PCT/IB2015/057526
§ 371 (c)(1),
(2) Date: Mar. 28, 2017

(87) PCT Pub. No.: WO2016/051376
PCT Pub. Date: Apr. 7, 2016

(65) Prior Publication Data
US 2017/0219447 A1      Aug. 3, 2017

(30) Foreign Application Priority Data

Oct. 2, 2014   (NL) .................................. N2013559
Feb. 19, 2015  (BE) .................................. 2015/5092

(51) Int. Cl.
*G01L 5/00*      (2006.01)
*G01L 1/22*      (2006.01)

(52) U.S. Cl.
CPC .......... *G01L 5/0085* (2013.01); *G01L 1/2243* (2013.01); *G01L 5/0004* (2013.01); *G01L 5/0057* (2013.01)

(58) Field of Classification Search
CPC ... G01L 5/0085; G01L 1/2243; G01L 5/0004; G01L 5/0057
(Continued)

(56) References Cited

U.S. PATENT DOCUMENTS 4,553,436 A * 11/1985 Hansson ............... G01P 15/123
                                                                  338/46
4,836,025 A *  6/1989 Mihara ............... G01P 15/0802
                                                                  257/E27.006
(Continued)

FOREIGN PATENT DOCUMENTS

FR      2788853 A1    7/2000
GB      1109831 A     4/1968
(Continued)

OTHER PUBLICATIONS

International Search Report and Written Opinion completed Jan. 14, 2016, pertaining to PCT/IB2015/057526 filed Oct. 1, 2015.
(Continued)

*Primary Examiner* — Max Noori
(74) *Attorney, Agent, or Firm* — Dinsmore & Shohl LLP (57) ABSTRACT

The invention has the objective of offering a sensor that allows for measuring the pressure force of the springs on the carbon brushes as well as the actual brush pressure on its contact surface. This is obtained by measuring between the carbon brush, and there is limited space through its holder, and the contact surface and is therefore characterized by the fact that the sensor is thinner than 4 mm, and that it is provided with a target (4) which is suspended in the sensor (1) by means of a mechanically deformable section (3), and where the sensor is fitted with one or more strain gauges (2) that is/are set up as such that it can detect the shearing of the mechanical deformable measuring section under pressure.
In contrast to the existing measuring sensors, the measuring strips also connect the suspension points of the mechanically deformable elements with the sensor and/or the suspended target or measuring point through which sensitivity increases and makes the sensor useful for such applications.

24 Claims, 6 Drawing Sheets

(58) Field of Classification Search
USPC .......................................................... 73/767
See application file for complete search history.

(56) References Cited

U.S. PATENT DOCUMENTS

| | | | |
|---|---|---|---|
| 4,869,107 A * | 9/1989 | Murakami | G01P 15/0802 338/2 |
| 4,990,986 A * | 2/1991 | Murakami | G01P 15/0802 257/419 |
| 5,698,785 A | 12/1997 | Rich et al. | |
| 6,230,571 B1 | 5/2001 | Kimerer, Jr. | |

FOREIGN PATENT DOCUMENTS

| | | |
|---|---|---|
| WO | 9531700 A1 | 11/1995 |
| WO | 03071241 A1 | 8/2003 |

OTHER PUBLICATIONS

Belgium Search Report completed Oct. 28, 2015, pertaining to BE201505092 filed Feb. 19, 2015.
Netherlands Search Report completed May 21, 2015, pertaining to NL2013559 filed Oct. 2, 2014.

* cited by examiner

PRESSURE SENSOR CONTAINING MECHANICALLY DEFORMING ELEMENTS

CROSS REFERENCES TO RELATED APPLICATIONS

This application is a national-stage entry under 35 U.S.C. § 371 of International Application No. PCT/IB2015/057526, filed Oct. 1, 2015, which claims the benefit of priority to Belgian application 2015/05092, filed Feb. 19, 2015, and to Netherlands patent application 2013559, filed Oct. 2, 2014.

BACKGROUND

In case of carbon brush electric machines, such as engines, alternators, generators or others, the brushes are pushed against their contact surfaces, such as slip rings or collectors, via a spring. This resilience is required to ensure the engine's proper functioning. In case of the resilience being too high, the brushes and the slip ring or collector wears too quickly (that causes contamination and decreases the insulation resistance). In case of the resilience being too low, bad contact, arcing and degradation due to sparking develops, which leads to damage. If pressure is mutually unequal, the power distribution will become proportionally unbalanced and that, in the first instance, will cause the brushes to wear irregularly and complicate maintenance and, in a further phase, cause some of the brushes to become overloaded and burn with all the associated consequences (could even lead to significant engine damage). It is therefore important to monitor the spring resilience carefully because the spring resilience may start showing signs of deviance after some time due to the temperature, vibrations and even sometimes electrical current that could flow through the springs. It is therefore important to measure the springs and brush pressure regularly.

The best solution for this would be to be able to measure the spring resilience of the carbon brush at its contact surface. However, the space here is extremely limited. The distance between the holder and its contact surface, for example, a slip ring, is firmly set by its required proper operation and accordingly typically ends up being between 2 to 3 mm irrespective of the size of the carbon brush. The spring resilience to be measured depends on the brush size and the application. For example, a traction engine will have a much larger spring resilience than a stationary engine due to the environmental vibrations. Overall, the spring resilience can vary from between 0.1 Kg and 6 Kg. In view of the large variation in the embodiments of the carbon brush holders and the large range of the pressures to be measured, the existing probes are always too large to be able to use them at the ideal places (between the brush and its contact surface, for example, between the brush and the slip ring). The current solutions consist of relatively large probes that always measure the pressure between the carbon brush and the spring resilience system. The range of these probes is frequently limited causing a need for different probes as a function of the pressure to be measured. By moving the measurement of the space between the brush and its contact surface, to the surface between the brush and the spring resilience system, it is sometimes necessary to take the stop angle of the spring resilience system into account in respect of the contact surface between the brush and the slip ring. In case of brushes with oblique heads or oblique holders, the values measured between the brush and pressure resilience system should be converted as function of the angular degrees to eventually be able to get the correct value of the brush contact pressure. Knowing that a single turbo generator of a power station could contain up to 200 brushes, it becomes evident that, in the industry, there is a need for a measuring or pressure sensor that can be deployed between the contact surface and the brush, and where the sensor has a wide pressure range and could therefore be deployed for both stationary and traction engines, alternators and other electrical engines.

DETAILED DESCRIPTION

This invention has the aim of offering a sensor (1) that allows for measuring the pressure force between the contact surface, for example the contact surface between a slip ring (15) and the brush (14), and that is therefore characterized by the fact that the sensor is thinner than 4 mm, and has nonetheless been fitted with a target (4) (also referred to as the measuring point or the pressure platform), which has been suspended, by means of mechanically deformable section (3), in a recess (5) in the sensor, and by which this sensor is fitted with one or more measuring strips (2), which has/have been designed as such that it/they can detect the shearing of, of the mechanically deformable section under pressure.

Figure 1:
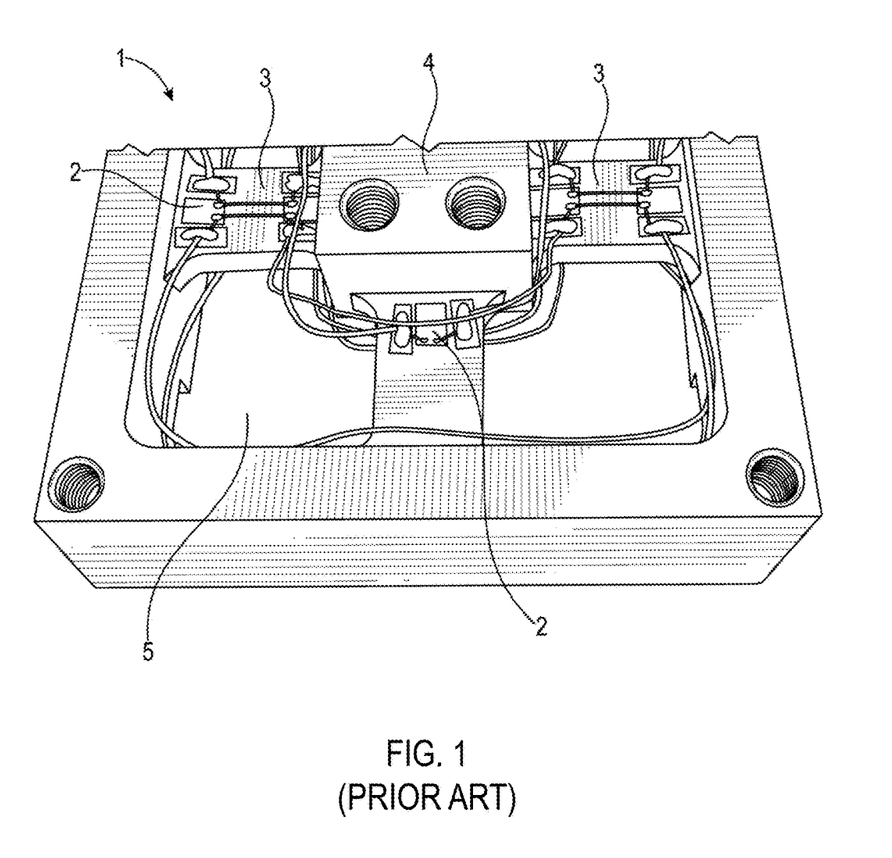
FIG. 1 is a section of the measuring sensor (1) according to the prior art with an indication of the strain gauges (2) on the mechanically deformable elements (3) with which the target (4) has been suspended in a recess (5) of the measuring sensor (1). The measuring strips are only located on the mechanically deformable elements and only extend in the longitudinal direction over these elements.

In contrast to existing measuring sensors, as for example shown in FIG. 1, the measuring strips (2) in this invention are not just lying on the mechanically deformable section (3) located between the measuring point (target) and the perimeter of the sensor. As becomes apparent from FIG. 1, the location of the measuring strips, herein also referred to as strain gauges, in the prior art sensor, extends longitudinally over the mechanically deformable section located between the central measuring point and the edge of the sensor. The aforementioned dimensions for the total thickness of the sensor in this layout are not possible since there has to be sufficient space (at least a few millimeters) on both sides of the deformable section to be able to detect the deformation (sagging) therein.

The measuring sensor also differs from the spring balancer as, for example, described in the PCT publication WO03/071241, which was specifically designed for measurements in the μg-mg range. These microbalances could never be deployed for measuring the aforementioned spring pressures since they should be located in the g-kg range. This difference in applications also clearly translates into another technical effect of the pressure sensor according to the invention. Insofar as the aforementioned micro balances also have a target (pressure platform (1 in WO03/071241)), which have been suspended by means of mechanically deformable sections (elements) (flexible pins or springs (3 in WO03/071241)) in a recess (frame (2 in WO03/071241)), it is clear from the images in WO03/071241 that these deformable elements are just as thick as the pressure platform and that the deformable elements are as long as possible. It is further stressed that, for the micro balances, the stability of the pressure platform can only be guaranteed in case of suspension by means of at least 3 deformable elements (see page 6 line 34 to page 7 line 1 of WO03/071241). In the measuring sensor of this invention, the deformable elements with which the target has been suspended in the recess are not only much shorter but there is also a difference in thickness between the deformable elements and the target. As becomes apparent from the figures and the following description, the sensor is, among others, characterized by the fact that the mechanically deformable elements (3) are thinner than the target and the surrounding (13) side with which they are connected. In addition, and in contrast to the flexible pins or springs from WO03/071241, the width of the deformable elements (3) is preferably equal to the width of the side of the target with which they are connected. Thus, in this invention it is indeed possible to obtain a stable pressure platform with at least two deformable elements.

Apart from the structural differences in the structure of the deformable elements, the pressure sensor is further characterized by the positioning of the measuring strips. In WO03/071241, the measuring strips on the flexible pins or springs are also placed on the crossing between the target and the pins or on the crossing between the pins and the frame (see FIG. 1 of WO03/071241). As becomes apparent from FIG. 1 of WO03/071241, the measuring strips (4) are located entirely on the flexible pins or springs (3), but never on the surrounding frame (2); in addition, the measuring strips are all oriented in the same direction because, taken together they form the Wheatstone bridge for the measurement. The measurement in the micro balance from WO03/071241 is therefore exclusively based on the deformation of the flexible pins or springs, consequently it is not surprising that, for these devices, it is always the aim to make these pins or springs as long as possible (also see the preferred embodiment on page 10 lines 5-13 of WO03/071241). In the present invention, the measuring strips have been placed as such that they not only measure the deformation between the strip connections between the target (4) and the surrounding side (13), but also the shearing of of the strip connections in respect of the surrounding side and/or target. To this end, the measuring strips are situated in part on the deformable elements (3) and in part on the surrounding side (13) or, respectively, the target (4). Alternatively, in other words, in this invention, the measuring strips bridge (cross) the connection line between the deformable elements (13) and the surrounding side (13) or, respectively, the target (4).

Figure 7:
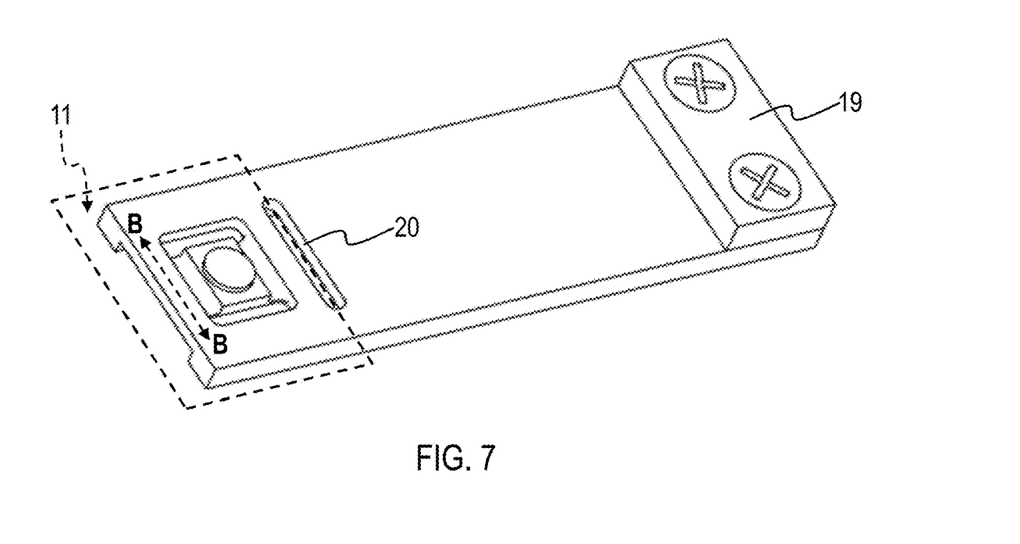
FIG. 7 is a perspective top view of a measuring sensor (1) according to the invention, provided with a separation excision (20) that extends over the width (segment B-B) between the two longitudinally adjacent sides (13-L). This measuring sensor, outside of the measuring zone (11) has also been fitted with a cable holder (19), through which the total thickness at this location is more than 4 mm.

As is explained in more detail below, this configuration of this invention ensures that it is indeed possible to obtain a pressure measuring sensor with a measuring zone (11) of which the total thickness is less than 3 mm, more especially between 2 mm and 4 mm thick; even more especially between 2 and 3 mm thick; in a further embodiment even between 1 mm and 2 mm. The measuring zone eventually corresponds to the section of the sensor that is effectively installed below the brush to be measured. In a special embodiment, the total thickness of less than 4 mm could extend over the entire surface of the measuring sensor. Such a version of the measuring sensor in accordance with this invention is shown in FIGS. 3-6. Such a form of the measuring sensor will have a total thickness of less than or equal to 4 mm, especially less than 3 mm; more especially between 2 mm and 4 mm thick; even more especially between 2 and 3 mm thick; in a further embodiment even between 1 mm and 2 mm. Outside of the measuring zone, and as is, for example, shown in FIG. 7, the measuring sensor could be thicker. For example, the measuring sensor outside of the measuring zone could be fitted with a cable holder (19), which can keep the wiring from the sensor to the measuring strips in place. The measuring zone (11) will therefore contain the measuring point (4), herein also referred to as the target or the pressure platform, which has been suspended by means of one or more mechanically deformable elements (3) in an excision (5) in the sensor's measuring zone. When measuring, the sensor or the measuring zone of the sensor is placed between the contact surface, such as the collector (or slip ring) (15) and the carbon brush (14), by which the brush comes to rest on the measuring point (target). Under the influence of the pressure, the target will twist the mechanically deformable elements with which it has been suspended in the excision. Therefore, there will always be a space in the measuring zone below the target in which the deformation of the mechanically deformable elements can take place. The space can simply follow from the suspension of the target in the excision, and, in so doing, implies that in a possible embodiment of this invention, the thickness of the target and the thickness of the mechanically deformable elements is less than the thickness of the surrounding sides (13) in the measuring zone. In order to increase the range of the measuring sensor even further, the measuring zone can moreover be provided with a relief element (12) that is directed away from the brush when in use, or is positioned at the bottom of the measuring sensor during use. Thus in one embodiment the measuring sensor is characterized in that, the measuring zone is provided with one or more relief element (12) that is directed away from the brush when in use, or is positioned at the bottom of the measuring sensor during use. In the presence of these relief elements, it is no longer necessary that the thickness of the target be less than the thickness of the surrounding side. In contrast, the thickness of the deformable elements will indeed always be less than the thickness of the surrounding sides. In the presence of the aforementioned relief elements, the measuring sensor, according to the invention and in a first embodiment, could be characterized by the fact that the deformable (3) elements and the target (4) are thinner than the thickness of the surrounding sides (13) of the recess (5) in the measuring zone. In a second embodiment and in the presence of the relief elements, the measuring sensor could be characterized by the thickness of the target (4) being equal to the thickness of the surrounding sides (13) of the recess (5) in the measuring zone and in that only the thickness of the deformable elements is less than the thickness of the surrounding sides (13) of the recess (5) in the measuring zone.

In the embodiment as shown in FIGS. 3, 4, 5 and 7, these relief elements take on the form of raised edges on the surface that does not make contact with the drag brush during use. As shown, these raised edges preferably protrude over the entire length of the measuring sensor. In doing so and as is explained further below, there is the option of tucking away the wiring in the measuring sensor at the bottom. As already indicated above, in each of the aforementioned embodiments, the thickness of the deformable elements is less (3) than the thickness of the target and the surrounding side (13) with which they are connected.

In the embodiment as shown in the FIGS. 3, 4, 5 and 7, the measuring sensor is actually manufactured from a single part (plate) into which the elements of the measuring zone and the raised edges are milled. For this embodiment, it means that the basic material should be machined at the top as well as at the bottom. Given the maximum thickness of 4 mm or less to even 1 mm for the measuring sensor, it is not easy to prevent deformation during processing. In an alternative embodiment, and as has been shown in the FIGS. 8 and 9, the measuring sensor could also be manufactured from two parts (plates), whereby each of these two parts should only be processed on one surface. This makes it possible to fix the parts on the non-processed side during processing and to, in so doing, prevent deformation and this facilitates obtaining a more accurate result. The measuring zone (11) is milled out with its elements in the first part. The raised edges (12) and any further recesses (24 to 27) for tucking away the wiring are milled out in the second part.

In special embodiment, the measuring sensor is therefore further characterized by the fact that the surface of the measuring sensor that does not make any contact with the drag brush, is provided with raised edges (12), where these either form part of the part that contains the measuring zone or form part of the second part that is connected to the part that contains the measuring zone.

Figure 8:
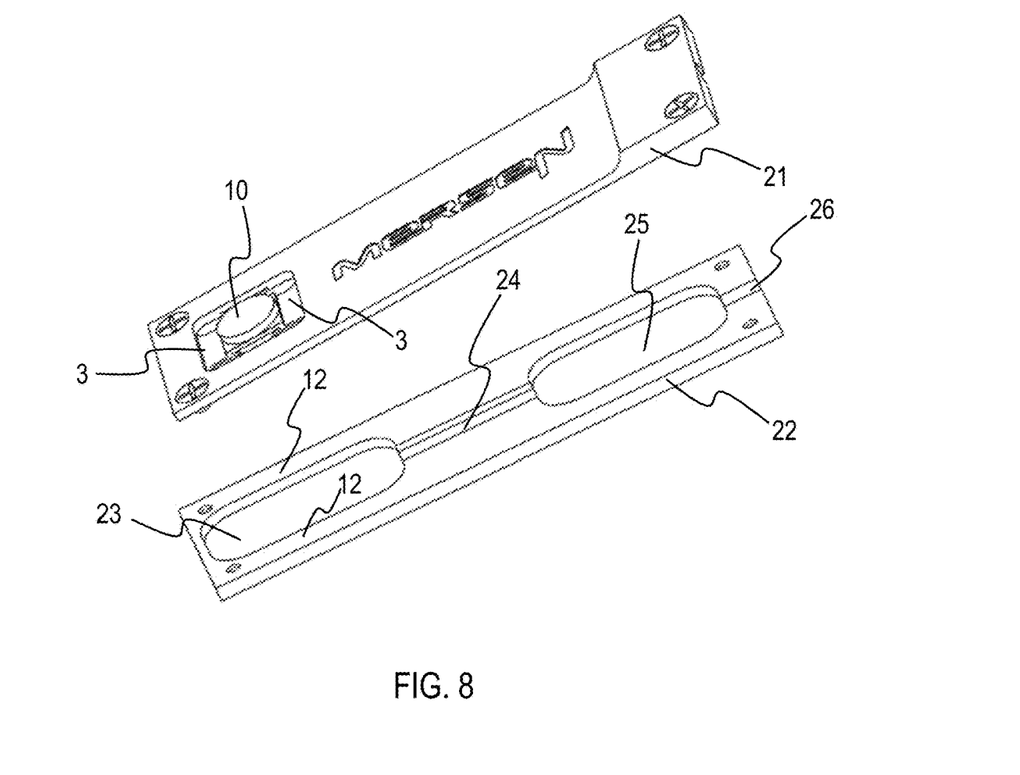
FIG. 8 is a layered perspective top view of a measuring sensor according to the invention, where it is made of two parts (21, 22) of which one part (21), includes the elements of the measuring zone, including the mechanically deformable elements (3) and the target with the fulcrum (10). The second part (22) here includes the relief elements (12), which during use is directed away of the drag brush, and realizes a free space (23) below the target. The wiring can be tucked away in this, with further recesses (24, 25, 26) in the shown version to lead the wiring to the outside.
Figure 9A:
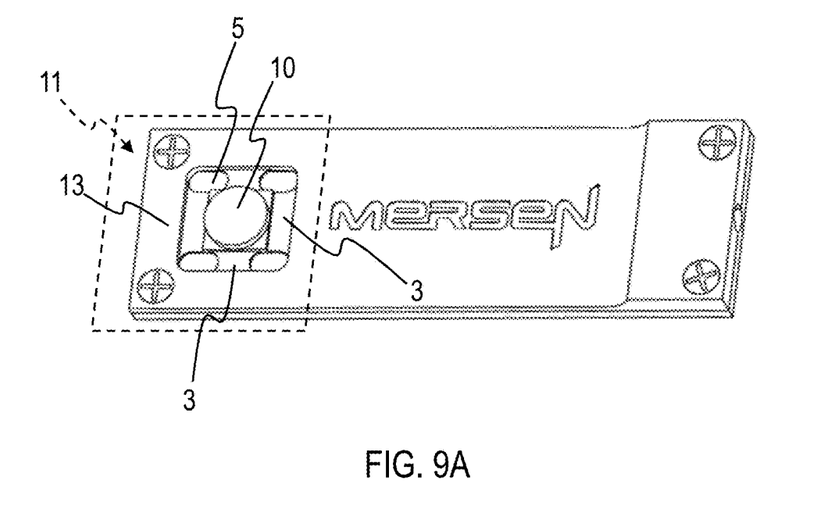
FIG. 9A is a top view of the assembled sensor according to FIG. 8. In this, the target (4) is suspended by means of 4 mechanically deformable elements (3) in the measuring zone (11).
Figure 9B:
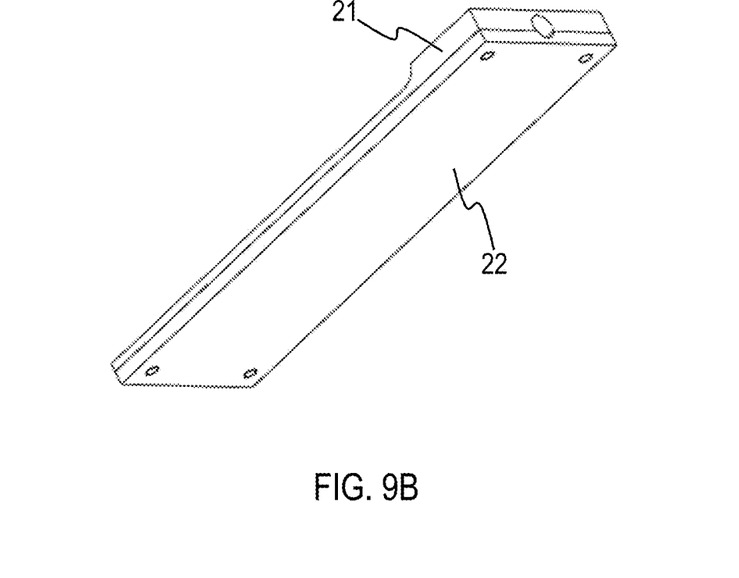
FIG. 9B is a bottom view of the assembled sensor according to FIG. 8. As the second part (22) has only been processed on the one side, this part closes the bottom of the sensor with a level side.

The embodiment as shown in the FIGS. 8 and 9, have the additional advantage that the measuring strips and associated wiring are located in a completely enclosed housing. This not only enlarges the robustness, but also prevents undesired contact with environmental materials such as graphite and lubricants.

In a special embodiment, for the measuring sensor of the invention, the deformable elements are just as wide as the width of the side of the target with which they are connected. It preferably consists of strip connections that are just as wide as the width of the side of the target with which they are connected. Since, in a preferential form of the invention, the elements from the measuring zone are manufactured in situ during the processing of a work piece (part, plate), it implies that these elements, i.e. the target (4), deformable elements (3), relief element (10), surrounding sides (13), raised edges (12), are manufactured from the same material. As explained below, it is made of the materials from which this type of measuring sensors are normally manufactured; with especially aluminium, comprehensive aluminium alloys such as 2024 t6 aluminium, 6061 t6 aluminium and 7075 t6 aluminium.

As already indicated above, the brush comes to rest on the measuring point (target) (4) during measuring. Therefore, the target which will make contact with the brush, is preferably fitted with a relief element (10) that protrudes above the surrounding sides (13) of the aforementioned recess, herein also referred to a the fulcrum or supporting point. In order to safeguard the possible placement between the contact surface, for example, the slip ring, and the brush; the relief element (fulcrum) will typically only protrude ⅔ to 1/10 of the total height of the surrounding sides. As already indicated above, the sensor of this invention is characterized by the fact that the strain gauges are not only located on the mechanically deformable element with which the target has been suspended in the sensor, but also on the target and/or the surrounding sides of the excision that contain the measuring point. As becomes apparent from the enclosed FIGS. 4 and 5, the strain gauges in this invention also cross the connection line and/or the fault line (as, for example, indicated with segment AA on the FIG. 3 or 5) of the mechanically deformable elements with the rest of the measuring sensor. On the one hand, these connection lines correspond with the connection lines between the mechanically deformable element (3) and the surrounding side (13); on the other hand, with the connection lines between a mechanically deformable element (3) and the target (4). In both cases, this connection line (AA) limits the transition between the thinner mechanically deformable element and the thicker surrounding side or target. Within the context of this invention, it therefore boils down to the fact that these connection lines or fault lines correspond with the transition between the mechanically deformable elements and the rest of the measuring sensor. Thus correspond on the one hand, the transition line between the mechanically deformable elements and the surrounding side; on the other hand, the transition between the mechanically deformable element and the target.

As becomes apparent from the accompanying figures, the mechanically deformable elements in this invention are thinner than the target and the surrounding (13) side with which they are connected. In a special embodiment, the mechanically deformable elements consist of milled strip connections between the target and the rest of the probe. The recesses (5) are typically drilled and/or cut out recesses in the measuring zone of the sensor. During drilling out or cutting out, there develops a curved excision of which the diameter corresponds with the drill diameter or the thickness of the cutting device near the attachment of the mechanically deformable elements with the rest of the sensor and especially near the connection with the surrounding sides. It is well known that these points are the weakest point for attaching the mechanically deformable elements with the rest of the sensor and that the mechanically deformable elements will tear off from these points in case of overload. Within the context of this invention, the connection line, which is crossed by strain gauges in this embodiment, runs between these connection points. As shown with segment AA in FIG. 5, in this embodiment, the connection line (hereinafter sometimes also referred to as connector) runs along the tangent line of the circles of which the aforementioned curved excisions are arc lengths. Or, in other words, in this invention, the measuring sensor is characterized in that one or more strain gauges (3) cross(es) a connector (AA) of the mechanically deformable element with the rest of the measuring sensor, where, in a special embodiment, this connector runs through the tangent line on the surrounding sides of the circles (16) of which the curved excisions near the connection with the mechanically deformable element with the rest of the measuring sensor, are the arc lengths (17).

Figure 2A:
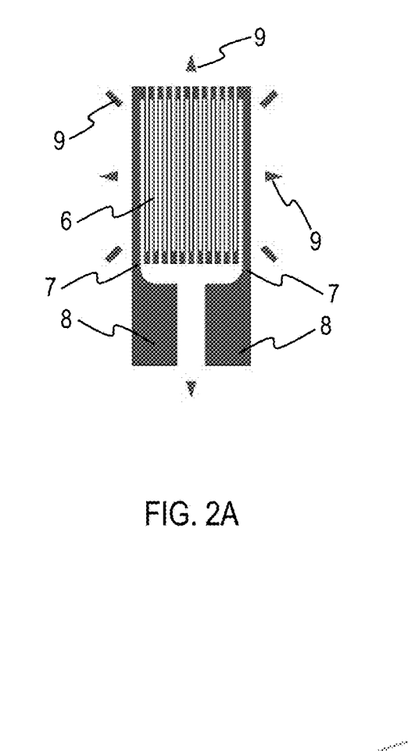
FIG. 2A is a typical strain gauge consisting of a film with, on it, a grid (6) of electrically conductive material. Fitted on one side with an end connection (7) with soldered points (8). In addition, the film has been provided with markers (9), which allows for aligning the grid more easily. Such a strain gauge measures a one-dimensional strain in the longitudinal direction.
Figure 2B:
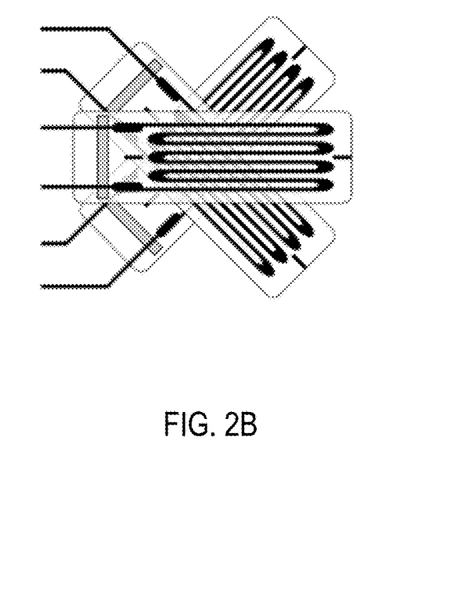
FIG. 2B is a rosette orientation of the three strain gauges to be able to detect strain in more directions.
Figure 2C:
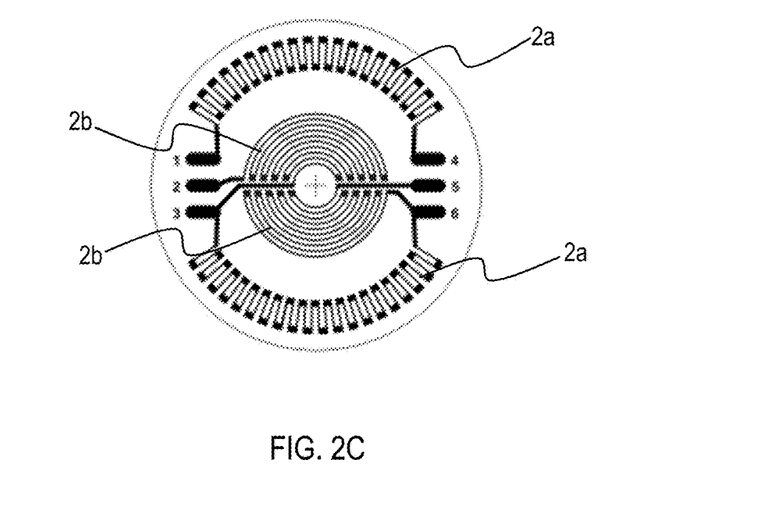
FIG. 2C is a membrane strain gauge for pressure recorders. The two outer strain gauges (2a) measure the radial strain, and the two inner ones (2b) de tangential strain. Not all the connections for the bridge of Wheatstone have already been made, so that, if needed, resistors could still be installed for calibration and temperature compensation.
Figure 3:
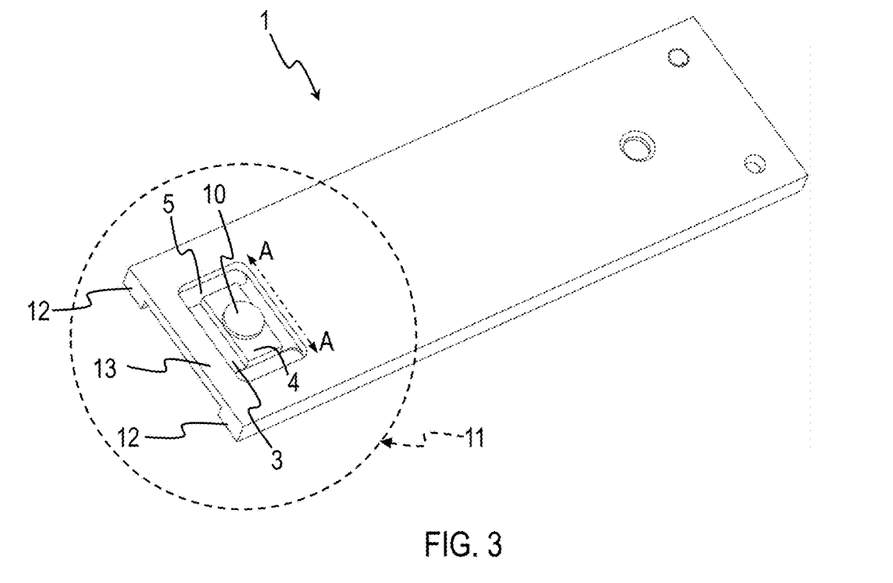
FIG. 3 is a plan of a measuring sensor (1) according to the invention, provided with an excision (recess) (5) in which a measuring point (target) (4) has been suspended by means of two mechanically deformable elements (3). The target has also been provided with a protruding fulcrum (10) on when the brush rests when measuring. One of the transition lines between the mechanically deformable elements and the rest of the sensor, being between the mechanically deformable element and an adjacent side has been indicated with the segment (AA).
Figure 4:
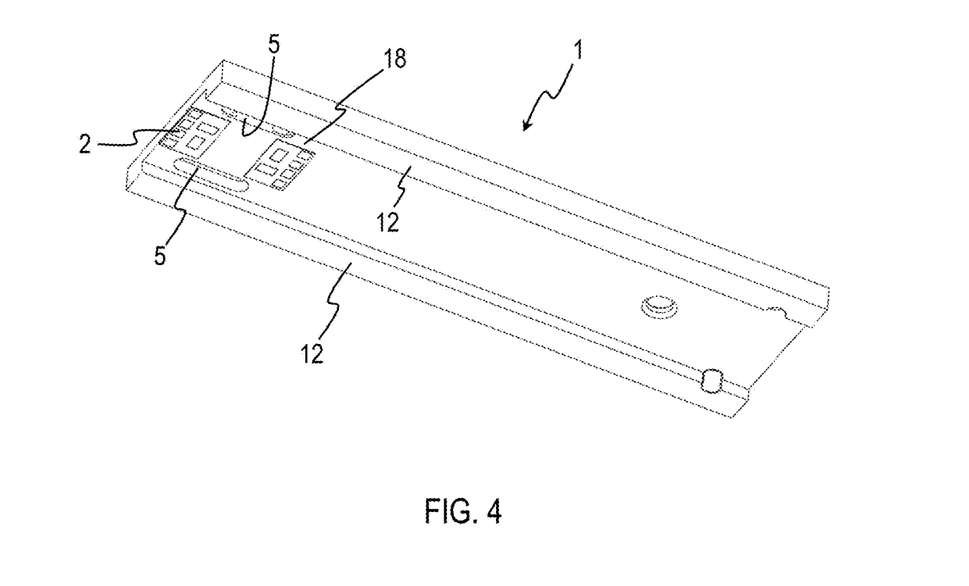
FIG. 4 is a perspective plan of a measuring sensor (1) according to the invention, provided with a measuring zone (11) with excision (recess) (5). In this embodiment, there are two strain gauges (2) per deformable element, of which the measuring grids (6) are oriented at perpendicular angles opposite each other. It is also visible that raised longitudinal edges (12) extend over the entire length of the measuring sensor.
Figure 5:
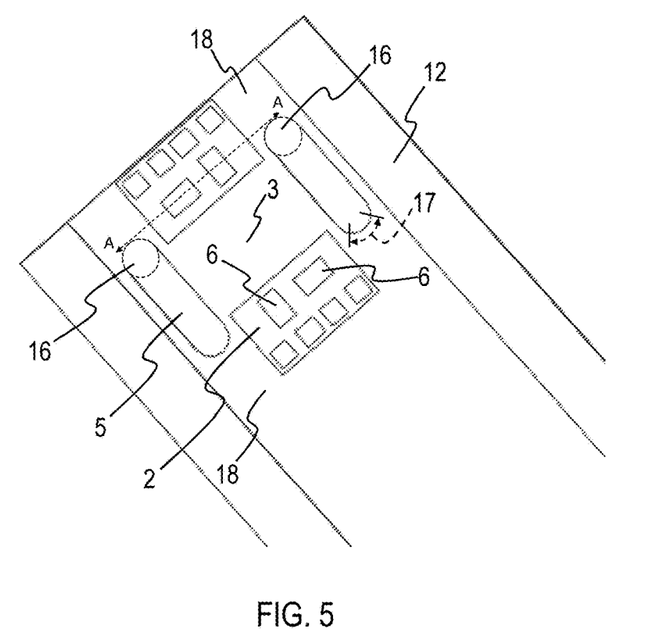
FIG. 5 is a detail bottom view of a measuring sensor (1) according to the invention, with an indication of the connector (AA) between a mechanically deformable element (3) and a surrounding side (13) of the excision (5). As becomes apparent from this image, one of these strain gauges crosses the connector (AA), and the other strain gauge rests against the connector, but in contrast to the prior art, on the surrounding side (13).
Figure 6:
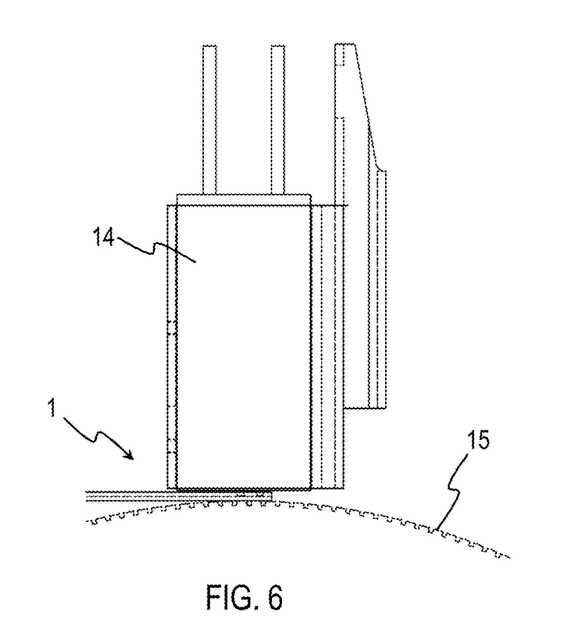
FIG. 6 is a side view of a measuring sensor (a) when placed between a carbon brush (o) and collector (p).

The measuring strips of this invention are therefore characterized by the fact that the grid (6) of these strips cross a connector (AA) between a mechanically deformable element (3) and the surrounding sides (13) and/or a connector between a mechanically deformable element and the suspended target (4). The positioning of the measuring section of the strain gauges across these connectors, also referred to as the fault lines, ensures that, in contrast to simply measuring the deflection of the mechanically deformable element, it is now rather the shear deformation of this element that is measured on its connection site. In comparison with the prior art configuration mentioned above, this gives rise to a greater sensitivity and a wider range. This sensitivity and range of the sensor can be increased further by increasing the number of strain gauges. This is also possible by fitting more of the deformable elements with strain gauges: by fitting multiple strain gauges per connector; or combinations of both. Such an embodiment has, for example, been shown in the FIGS. 4 and 5 below, in which the connector is crossed by two grids (6) of two strain gauges. In this example, each of the mechanically deformable elements has been fitted with two strain gauges, and the grids (6) of these gauges cross the connector between the mechanically deformable elements (3) and the surrounding side (13) of the excision. The sides are transversally oriented in this specific embodiment. Besides the number of strain gauges, and the positioning of the strain gauges across the connectors, the sensitivity of the sensor could be further influenced by the orientation of the strain gauges. As is already known, a strain gauge consists of a film with an electrical conductor, and where the strip measures a one-dimensional strain by means of a grid (6). A graphic representation of a strain gauge is shown in FIG. 2A. Such a strain gauge is much more sensitive for straining in a vertical direction, and therefore only allows measuring strain in one dimension. By applying multiple gauges with differing orientation, there is a possibility of measuring the strain in multiple directions. Therefore in a further embodiment multiple strain gauges are present per connector, whereby the grids of these strain gauges cross the connector in various directions, for example, in a rosette shape as shown in FIG. 2B, or perpendicularly to each other as shown in FIGS. 4 and 5. In an alternative embodiment and in this regard, membrane strain gauges, which measure the strain in various dimensions, are used as, for example, shown in FIG. 2C, and where the two outer strain gauges (2a) measure the radial strain, and the two inner ones (2c) de tangential strain. In a special embodiment, the connector is crossed by two strain gauges of which the grids (6) are oriented perpendicularly to each other, i.e. strain gauges of which the grids (6) are oriented perpendicularly to each other. Such a configuration leads to a further increase in accuracy, sensitivity and a wider range of the measuring sensor according to this invention.

In addition to the number of strain gauges, the positioning of the strain gauges and the orientation of the strain gauges, it has been established that the sensitivity and the range of the measuring sensor can also be increased by separating one or more of the surrounding sides (13), which contain(s) a strain gauge by means of an excision (20), hereinafter also referred to as separation excision, from the rest of the measuring sensor. This excision is characterized by a width varying from ½ to ⅔ of the surrounding side and a length that, at most, corresponds with the distance between the two adjacent sides (shown as section B-B in FIG. 7). The embodiments of this invention therefore include the presence of one or more separation excisions (20) as a possible further characteristic. If present, the separation excisions will also form the limits of the measuring zone within the measuring sensor. The thickness of the deformable connections and the choice of materials used could further influence the sensitivity. It will be clear to the expert that this measuring sensor is made from the usual material. Typically, from metal such as iron, titanium, aluminium and magnesium; and especially from aluminium, comprehensive aluminium alloys such as 2024 t6 aluminium, 6061-t6 aluminium and 7075-t6 aluminium.

The measuring strips are usually glued to the surface of the component of which the strain has to be measured. In addition, here, the strain gauges will also be glued over the aforementioned connectors of the mechanically deformable elements in accordance with the usual standard method. To facilitate the application of the strain gauges over the connector, the surface to which they are applied should preferably run over this connector. In this respect and in an embodiment of this invention, the surrounding side and the target at the connector will be fitted with a surface (18) that is located at the same level as the surface of the mechanically deformable elements to which the strain gauges are applied. These strain gauges are preferably applied to the surface that is oriented away from the carbon brush during use. As shown in FIGS. 4 and 5, in a further embodiment, the surfaces that form part of the surrounding side and the target are at the same height. i.e., all of these are located at the same height as the surface of the mechanically deformable elements to which the strain gauges are applied. In this embodiment, the surrounding side (13), which has also been fitted with one or more strain gauges (2) at the location of the connector and the mechanically deformable elements, is transversally oriented. This embodiment is also characterized by the fact that the excision (5) consists of a recess, more especially a square recess; even a rectangular recess. Other recesses are obviously possible, such as the square recess (5) in the prior art (FIG. 1), a round recess, a rectangular recess and other similar forms. Therefore, in an embodiment of this invention, the measuring sensor is characterized by the fact that the excision is a recess, more especially a square recess.

In a special embodiment, the measuring sensor is characterized by the fact that the excision is a square, more especially rectangular recess, in which the target (4) is suspended by means of two to four mechanically deformable elements (3) and whereby these mechanically deformable elements are crossed at their connector with the rest of the measuring sensor. In particular at their connector with the surrounding sides (13) by one or more; in particularly by two, strain gauges, more especially by a grid of these, one or more and especially of two measuring strips (preferably a grid in which the two strain gauges are perpendicular to each other); and whereby the deformable elements (3) in the embodiments above are thinner than the surrounding sides (13). In a first instance, this special embodiment could be further characterized by the fact there are only two mechanically deformable elements and that these two deformable elements are oriented longitudinally in the measuring sensor. In a second instance, this special embodiment could be further characterized by the fact that the connectors are connected by multiple strain gauges, in which these strain gauges cross the connector in multiple directions, especially by two strain gauges that are oriented perpendicularly to each other. In a second instance, the connector is crossed by the grid(s) (6) of the strain gauges, or especially by a grid of these one or more, and more especially of two measuring strips. This second instance could further be characterized by the fact that only two of the mechanically deformable elements are fitted with measuring strips that cross the connector with the rest of the measuring sensor, and more especially the two mechanically deformable elements that are oriented longitudinally in the measuring sensor. In a third instance this special embodiment could be characterized further by the fact that the surrounding side (13), which has also been fitted with one or more strain gauges at the location of the connector and the mechanically deformable elements, is transversally oriented. In a fourth instance, this special embodiment could further be characterized by the fact that the measuring zone extends over the entire length of the measuring sensor. In a sixth instance, this special embodiment could further be characterized by the fact that the measuring sensor on the surface that does not make any contact with the drag brush during use, has been fitted with raised edges (12); in particular, over the entire length of the measuring zone. As may become apparent from the accompanying figures, a preferential form of the special embodiment includes each of these six further characteristics. In a seventh instance, the special embodiments could be further characterized by the fact that one or more of the surrounding sides (13) that contain(s) a measuring strip, is/are separated from the rest of the measuring sensor by means of a separation excision; in particular, one of the surrounding sides (13) that contain a measuring strip, is separated from the rest of the measuring sensor with a separation excision (20). In an eighth instance, each of the aforementioned embodiments is characterized by the fact that one or more strain gauges are located, at most, for ½ on the deformable elements, in particular, at most, for ⅓ on the deformable element. The predominant placement of the strain gauges on the surrounding sides is the best for observing the shearing of the deformable element under pressure. In combination with the perpendicularly set-up of the strain gauges, this gives the best result for accuracy, range and sensitivity of the measuring sensor in accordance with this invention.

The raised edges at the surface that are oriented away from the drag brush during use, create a space in the measuring zone below the target in which the deformation of the mechanically deformable elements can take place. There is the option of tucking away the wiring in the measuring sensor at the bottom by extending the raised edges across the entire length of the measuring sensor in this special embodiment. The strain gauges are connected to the associated electronics, in which the signal is amplified, calibrated, digitalized, via a short cable and then forwarded wirelessly to the pc. In comparison with the existing measuring sensors, one can, via this invention, get to sensors with a thickness of less than 3 mm, especially with a thickness of between 1 and 3 mm; more especially with a thickness of between 2 mm and 3 mm. even between 1 mm and 2.5 (in the examples shown, only 2.3 mm thick), whereby no additional space is any longer required and these can always be used directly below the brush. The probes of the measuring sensors in accordance with this invention provide a very high sensitivity of more than 5 mV/V where 2 mV/V is the general standard. This not only causes our sensors to be accurate (allows for measuring pressure changes of 1 g), but also quite solid and they can be deployed up to pressures of 10 kg, where there is still is a wide margin for overloading up to 35 kg. We were able to realize a measuring sensor with the aforementioned characteristics by approaching the mechanically deformable measuring section in a different manner. Although there exists extremely thin sensors based on measuring films, these are in no way eligible for this application due their insensitivity and inaccurate repetition pattern.

These and other aspects of this invention will become clear to the expert after reading the following description of the preferred embodiment and looking at the accompanying drawings.

The invention claimed is:

1. A measuring sensor for measuring brush pressure in carbon brush electrical machines, that contains a measuring zone that is provided with an excision and surrounding sides in which a target has been suspended by one or more mechanically deformable elements, wherein the measuring zone has a total thickness of less than or equal to 4 mm, whereby at least one of the mechanically deformable elements has been provided with one or more strain gauges which comprise grid(s) of electrically conductive material that cross(es) a connector (AA) of the mechanically deformable element with the rest of the measuring sensor.

2. A measuring sensor according to claim 1, wherein the mechanically deformable elements are thinner than the surrounding side with which they are connected.

3. A measuring sensor according to claim 1, wherein the connector (AA) is between the mechanically deformable element and the target.

4. A measuring sensor according to claim 1, wherein one or more of the strain gauges cross(es) the connector (AA) between the mechanically deformable element and the surrounding side of the excision, and the connector (AA) between the mechanically deformable element and the target.

5. A measuring sensor according to claim 1, wherein the connector (AA) of the mechanically deformable element is crossed by two strain gauges.

6. A measuring sensor according to claim 5, in which the two strain gauges are oriented perpendicularly towards each other.

7. A measuring sensor according to claim 1, wherein the grid of one or more of the strain gauges is located, at most, for ½ on the deformable element.

8. A measuring sensor according to claim 1, wherein the surface of the mechanically deformable element that contains one or more of the strain gauges, at the connector (AA), is located at the same height of the adjacent surface that forms part of the rest of the measuring sensor.

9. A measuring sensor according to claim 8, wherein the adjacent surface forms part of the surrounding side of the excision.

10. A measuring sensor according to claim 8, wherein the adjacent surface forms part of the target.

11. A measuring sensor according to claim 9, wherein the adjacent surface forms part of the surrounding side of the excision and the adjacent side that forms part of the target are located at the same height.

12. A measuring sensor according to claim 1, wherein the target at the surface that makes contact with the brush has been fitted with a relief element that protrudes above the surrounding side of the excision.

13. A measuring sensor according to claim 12, wherein the relief element only protrudes ⅔ to 1/10 of the total height of the surrounding sides.

14. A measuring sensor according to claim 1, wherein the excision consists of a recess.

15. A measuring sensor according to claim 13, wherein the target has been suspended in the recess by two mechanically deformable elements.

16. A measuring sensor according to claim 12, wherein the grid of one or more strain gauges crosses the connector (AA) between the mechanically deformable element and the surrounding sides of the recess.

17. A measuring sensor according to claim 16, wherein the connector (AA) between the mechanically deformable element and the surrounding sides of the recess are crossed by two measuring grids.

18. A measuring sensor according to claim 16, wherein the surrounding sides are oriented transversally.

19. A measuring sensor according to claim 15, wherein the adjacent surfaces from part of the surrounding sides that are located at the same height.

20. A measuring sensor according to claim 1, wherein the measuring sensor has been fitted with one or more separation excisions.

21. A measuring sensor according to claim 1, wherein the surface that does not make contact with the brush has been provided with raised edges on the longitudinal side.

22. A measuring sensor according to claim 1, wherein the measuring zone extends over the entire surface of the measuring sensor.

23. A measuring sensor according to claim 1, wherein the measuring sensor has a total thickness that is less than or equal to 4 mm.

24. A measuring sensor according to claim 1, wherein it is manufactured from metal.

* * * * *

UNITED STATES PATENT AND TRADEMARK OFFICE
CERTIFICATE OF CORRECTION

PATENT NO. : 10,151,655 B2  
APPLICATION NO. : 15/514857  
DATED : December 11, 2018  
INVENTOR(S) : Peter Ovaere and Pieter-Jan Schepens Page 1 of 1

It is certified that error appears in the above-identified patent and that said Letters Patent is hereby corrected as shown below:

In the Claims

Column 12, Line 17, Claim 19:
"the adjacent surfaces from part of the surrounding sides that"
Should read:
--the adjacent surfaces form part of the surrounding sides that--.

Signed and Sealed this
Twenty-fourth Day of September, 2019

Andrei Iancu
*Director of the United States Patent and Trademark Office*